H. M. WILLIAMSON & S. H. ALEXANDER.
RADIUMIZER.
APPLICATION FILED APR. 17, 1916. RENEWED JAN. 7, 1918.
1,302,115.
Patented Apr. 29, 1919.
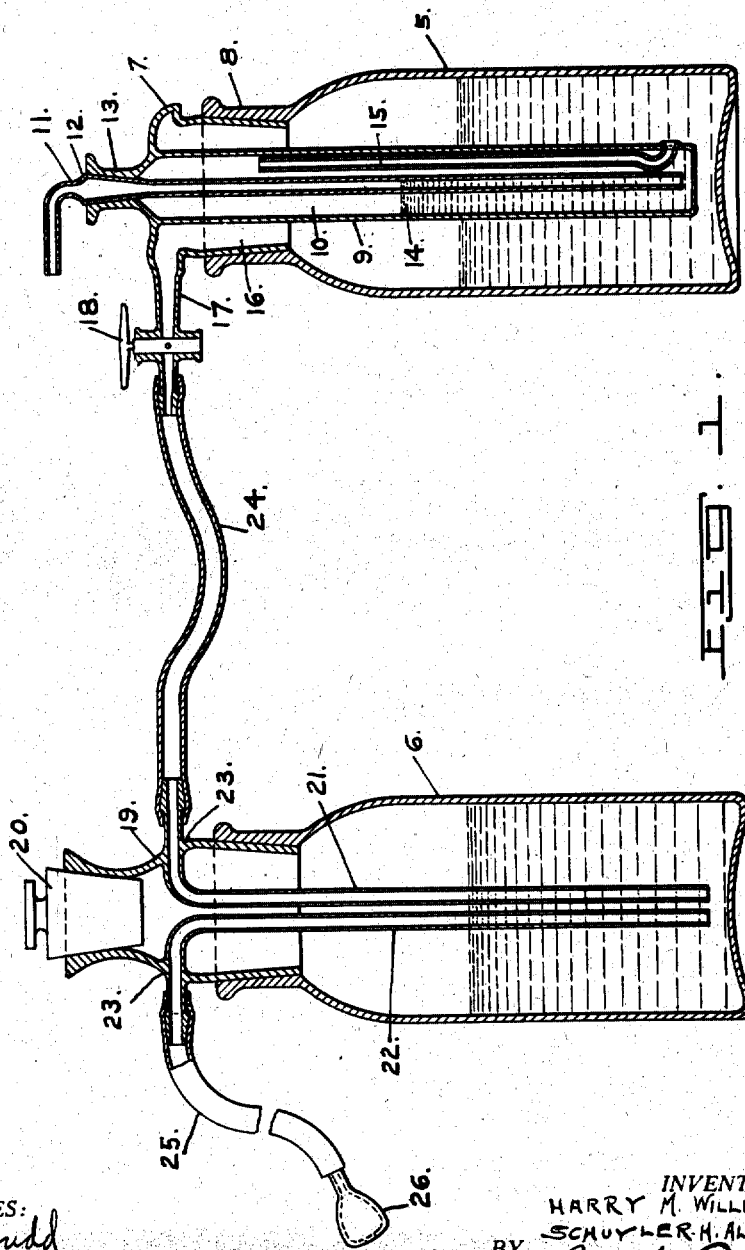

UNITED STATES PATENT OFFICE.

HARRY M. WILLIAMSON AND SCHUYLER H. ALEXANDER, OF DENVER, COLORADO.

RADIUMIZER.

1,302,115. Specification of Letters Patent. Patented Apr. 29, 1919.

Application filed April 17, 1916, Serial No. 91,555. Renewed January 7, 1918. Serial No. 210,773.

*To all whom it may concern:*

Be it known that we, HARRY M. WILLIAMSON and SCHUYLER H. ALEXANDER, citizens of the United States, and residents of the city and county of Denver, State of Colorado, have invented certain new and useful Improvements in Radiumizers, of which the following is a full, clear, and exact description, such as will enable others skilled in the art to make and use the same.

Our invention relates to improvements in radiumizers by which water, or other liquid may be charged with radium therapeutic qualities and taken into the human system.

Another object is to provide means whereby radium emanation may be conserved and precipitated in a liquid solution for therapeutic use.

Other objects of the invention will become apparent in the following detail description with reference to the accompanying drawing, forming a part hereof.

In this drawing, the figure is a sectional view of the entire apparatus comprising our invention.

Corresponding and like parts are referred to in the following description and indicated in the accompanying drawing by the same reference characters.

Let the numeral 5 designate a radium solution containing receptacle and the numeral 6 an emanation receiving and storage receptacle. Both of these receptacles are of bottle shape and preferably composed of glass, however they may be formed of any other suitable material. A glass stopper 7 is adapted to be received in the mouth 8 of the receptacle 5, the said stopper being ground to form an air tight closure. A glass tube 9 is integrally formed with the stopper 7 and depends from the latter into the receptacle 5, said tube forming an air purifying chamber 10. An air intake tube 11 is received through the stopper 7 into the air purifying chamber 10, the same depending into relatively close proximity to the bottom of the air purifying chamber 10 and communicating at its lower extremity with said chamber. The upper portion of this tube 11 is provided with a conical shaped part 12, which is seated in a portion 13 of the stopper 7, the outer extremity of said tube being extended at an angle and communicating with the atmosphere. The tube 11 may be removed, thereby opening an orifice through the stopper 7, through which, the air purifying chamber 10 may be filled with a chemical preparation 14 through which the air circulates and is purified before passing into the receptacle 5. A tube 15 is vertically disposed in the chamber 10, its lower extremity communicating with the interior of the receptacle 5, while its upper extremity communicates with the chamber 10 above the level of the chemical preparation 14 therein, thereby preventing the chemical 14 from passing into the receptacle 5. The stopper 7 is provided with a chamber, or space 16, surrounding the tube 9, with which space, an induction tube 17 communicates, the said induction tube 17 being controlled by a cock 18.

The receptacle 6 is provided with a hollow stopper 19, ground to form an air tight closure, the said stopper having an opening in the top thereof adapted to receive a ground plug 20. An induction tube 21 and an eduction tube 22 are integrally formed with the stopper 19, as shown at 23, and depend through the hollow of said stopper into relatively close proximity with the bottom of the receptacle 6, the tubes 21 and 22 being extended to the exterior of the stopper 19. The induction tube 21 is in communication with the eduction tube 17, of the receptacle 5, through a flexible tube 24, thereby placing the receptacles 5 and 6 in communication with each other. A flexible tube 25 is connected with the outer extremity of the eduction tube 22, a mouth piece 26 being fitted in the outer extremity of the flexible tube 25. The receptacle 6 is adapted to be filled with water, with which, the fumes, or radium emanation from the radium solution in the receptacle 5 is mixed.

In use, the patient creates a suction through the apparatus by sucking the mouth piece 26, and since the receptacle 6 is air tight, the removal of the liquid therefrom by the patient causes the fumes from the receptacle 5 to enter the receptacle 6 and mix with the liquid in the latter. This suction causes the air to be taken in through the tube 11, passing through the purifying chemical in the chamber 10 and passing out of the latter into the receptacle 5 through the tube 15, where it comes into contact with the radium solution and takes up the radium emanation and passes into the receptacle 6 through the eduction tube 17, conduit 24 and induction tube 21 into the receptacle 6, charging the water in the latter with said emanation.

If it should be desired to use only the radium fumes, or emanation without mixing the latter with water, it is only necessary to disconnect the conduit 24 from the tube 17 and use the emanation as it is emitted from said tube.

The water in the bottle 5 is of radio active quality, but necessarily must be of a relatively small degree. In other words, there is only a sufficient quantity of radium salt, which salt may be of any character, to cause an emanation of radium therefrom.

The cock 18 is employed for establishing or cutting off the communication between the receptacles 5 and 6, as the case may be.

While we have described and illustrated herein, a specific form of our invention, it is understood that we are not limited thereto and that the same may be modified and varied without departing from the spirit of the invention or the scope of the appended claims.

Having thus described our invention, what we claim and desire to secure by Letters Patent is:

1. A radiumizer, comprising a radium preparation containing receptacle, a radium emanation receiving and storage receptacle in communication with said first named receptacle, a tube depending into said first named receptacle and forming an air purifying chamber, said tube being extended into the radium preparation in said first named receptacle, a second tube extending into said first named tube and having one extremity in communication with the atmosphere while its other extremity is in communication with said first named tube, a third tube vertically positioned in said first named tube, said third tube having its upper extremity in communication with the chamber formed by said first named tube and its lower extremity in communication with the first named receptacle, and said first named receptacle having an eduction passage.

2. A radiumizer, comprising a radium preparation containing receptacle, a radium emanation receiving and storage receptacle in communication with said first named receptacle, a tube depending into said first named receptacle and extending into said radium preparation therein, said tube adapted to contain an air purifying chemical, a second tube extending into said first named tube and having one extremity in communication with the atmosphere while its other extremity is in communication with the first named tube submerged in said air purifying chemical, a third tube disposed vertically in said first named tube and having its upper extremity in communication with said first named tube above the level of the air purifying chemical therein while its lower extremity is in communication with said first named receptacle submerged in the radium preparation contained in said first named receptacle, said second named receptacle adapted to contain a liquid preparation in which said radium emanation is adapted to be precipitated, an induction tube having its discharge extremity submerged within said liquid preparation, and an eduction tube having one extremity submerged in said liquid preparation and its other extremity in communication with the exterior of the said second named receptacle.

3. A radiumizer, comprising a radium preparation containing receptacle, a radium emanation receiving and storage receptacle, a stopper for said first named receptacle, a member forming an air induction passage integrally formed with said stopper and depending into said first named receptacle, the discharge orifice of said air induction passage adapted to be submerged in the radium preparation in said first named receptacle, a stopper for said second named receptacle, a member forming an induction passage integrally formed with said stopper and depending into said second named receptacle, the discharge extremity being adapted to be submerged in a liquid contained within said second named receptacle, while the other extremity thereof is in communication with said first named receptacle, and an eduction member integrally formed with said last named stopper and depending into said last named receptacle, one extremity thereof being submerged in the liquid contained in said last named receptacle, while the other extremity thereof is exposed to the exterior of said last named receptacle.

In testimony whereof, we affix our signatures in the presence of two witnesses.

HARRY M. WILLIAMSON.
SCHUYLER H. ALEXANDER.

Witnesses:
   PAULINE L. POWELL,
   JNO. G. POWELL.